US012591250B2

(12) United States Patent (10) Patent No.: US 12,591,250 B2
Yan et al. (45) Date of Patent: Mar. 31, 2026

(54) ROBOT TASK EXECUTION METHOD AND APPARATUS, ROBOT, AND STORAGE MEDIUM

(71) Applicant: BEIJING INDEMIND TECHNOLOGY CO., LTD., Beijing (CN)

(72) Inventors: Dongkun Yan, Beijing (CN); Shuaishuai Wang, Beijing (CN); Dong Fan, Beijing (CN); Ziwen Liu, Beijing (CN)

(73) Assignee: BEIJING INDEMIND TECHNOLOGY CO., LTD., Beijing (CN)

( * ) Notice: Subject to any disclaimer, the term of this patent is extended or adjusted under 35 U.S.C. 154(b) by 225 days.

(21) Appl. No.: 18/571,017

(22) PCT Filed: Jun. 15, 2022

(86) PCT No.: PCT/CN2022/098817
§ 371 (c)(1),
(2) Date: Feb. 1, 2024

(87) PCT Pub. No.: WO2022/262743
PCT Pub. Date: Dec. 22, 2022

(65) Prior Publication Data
US 2024/0201700 A1 Jun. 20, 2024

(30) Foreign Application Priority Data
Jun. 18, 2021 (CN) .......................... 202110681640.3

(51) Int. Cl.
*G05D 1/246* (2024.01)
*G05D 1/229* (2024.01)
(Continued)

(52) U.S. Cl.
CPC ......... *G05D 1/2464* (2024.01); *G05D 1/2295* (2024.01); *G05D 1/6482* (2024.01); *G05D 2105/10* (2024.01); *G05D 2107/40* (2024.01)

(58) Field of Classification Search
CPC .. G05D 1/2464; G05D 1/2295; G05D 1/6482; G05D 2105/10; G05D 2107/40;
(Continued)

(56) References Cited

U.S. PATENT DOCUMENTS 9,566,706 B2 * 2/2017 Yoon ...................... B25J 9/0006
11,274,929 B1 * 3/2022 Afrouzi ..................... G06T 7/30
(Continued)

FOREIGN PATENT DOCUMENTS

CN 109358650 A 2/2019
CN 111562784 A 8/2020
(Continued)

OTHER PUBLICATIONS

Machine translation of CN 111562784 retrieved from Espacenet on Sep. 28, 2025 (Year: 2025).*
(Continued)

*Primary Examiner* — Thomas Ingram
(74) *Attorney, Agent, or Firm* — Maschoff Brennan

(57) ABSTRACT

The present application discloses a robot task execution method, apparatus, robot and storage medium. The method comprises: acquiring a training trajectory and an environment map in a training mode; generating a target region for tasks to be performed by a robot based on the environment map and the training trajectory, wherein the target region is a maximum envelope region in which the robot can complete tasks autonomously; controlling the robot to traverse the target region until the robot completes the tasks to be performed. By adopting the above technical solution, the robot can perform tasks stably and efficiently in various
(Continued)

environmental regions, thereby being able to be applied to various application scenarios.

18 Claims, 5 Drawing Sheets

(51) Int. Cl.

| | | |
|---|---|---|
| *G05D 1/648* | (2024.01) | |
| *G05D 105/10* | (2024.01) | |
| *G05D 107/40* | (2024.01) | |

(58) Field of Classification Search
CPC . G05D 2109/10; G05D 1/2297; G05D 1/0219
See application file for complete search history.

(56) References Cited

U.S. PATENT DOCUMENTS

| | | | | |
|---|---|---|---|---|
| 2016/0129593 | A1* | 5/2016 | Wolowelsky | B25J 5/00 901/1 |
| 2018/0267552 | A1* | 9/2018 | Artes | G05D 1/246 |
| 2019/0025851 | A1* | 1/2019 | Ebrahimi Afrouzi | G05D 1/648 |
| 2019/0369620 | A1* | 12/2019 | Zhou | G05D 1/2464 |
| 2020/0047343 | A1* | 2/2020 | Bal | B25J 9/1689 |
| 2020/0110603 | A1* | 4/2020 | Lin | G06F 9/226 |
| 2020/0150655 | A1* | 5/2020 | Artes | G05D 1/0016 |
| 2021/0247775 | A1* | 8/2021 | Cen | B25J 9/1664 |
| 2021/0302962 | A1 | 9/2021 | Sakaguchi et al. | |
| 2022/0007563 | A1* | 1/2022 | Suga | G05D 1/648 |
| 2022/0026920 | A1* | 1/2022 | Ebrahimi Afrouzi | G06N 3/0495 |
| 2023/0367324 | A1* | 11/2023 | Ebrahimi Afrouzi | A47L 9/2826 |

FOREIGN PATENT DOCUMENTS

| | | |
|---|---|---|
| CN | 112306067 A | 2/2021 |
| CN | 112462780 A | 3/2021 |
| CN | 112612273 A | 4/2021 |
| CN | 112904845 A | 6/2021 |
| CN | 113359743 A | 9/2021 |
| DE | 10 2019 125 469 A1 | 3/2021 |
| WO | 2020/031494 A1 | 2/2020 |
| WO | 2020/129722 A1 | 6/2020 |
| WO | 2022/111539 A1 | 6/2022 |

OTHER PUBLICATIONS

International Search Report and Written Opinion of the International Searching Authority dated Aug. 29, 2022 as received in Application No. PCT/CN2022/098817.
Extended European Search Report dated Sep. 20, 2024 as received in Application No. 22824222.8.

* cited by examiner

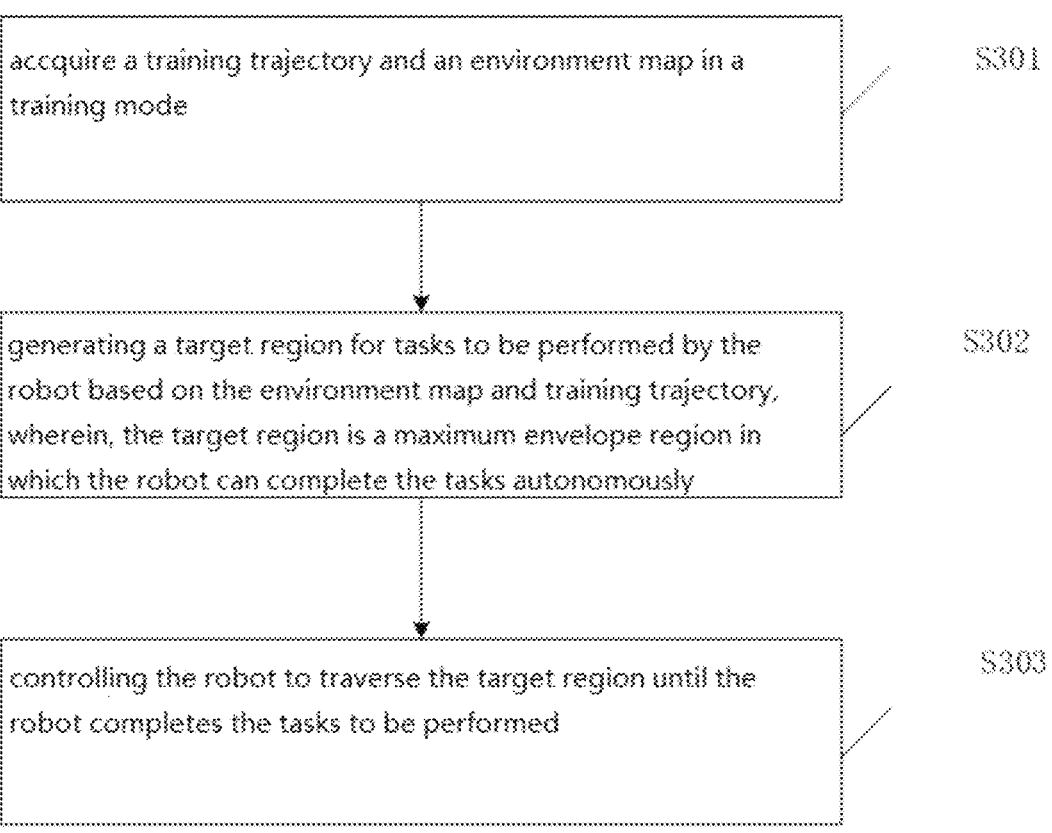

accquire a training trajectory and an environment map in a training mode     S301 generating a target region for tasks to be performed by the robot based on the environment map and training trajectory, wherein, the target region is a maximum envelope region in which the robot can complete the tasks autonomously     S302 controlling the robot to traverse the target region until the robot completes the tasks to be performed     S303

Fig. 3

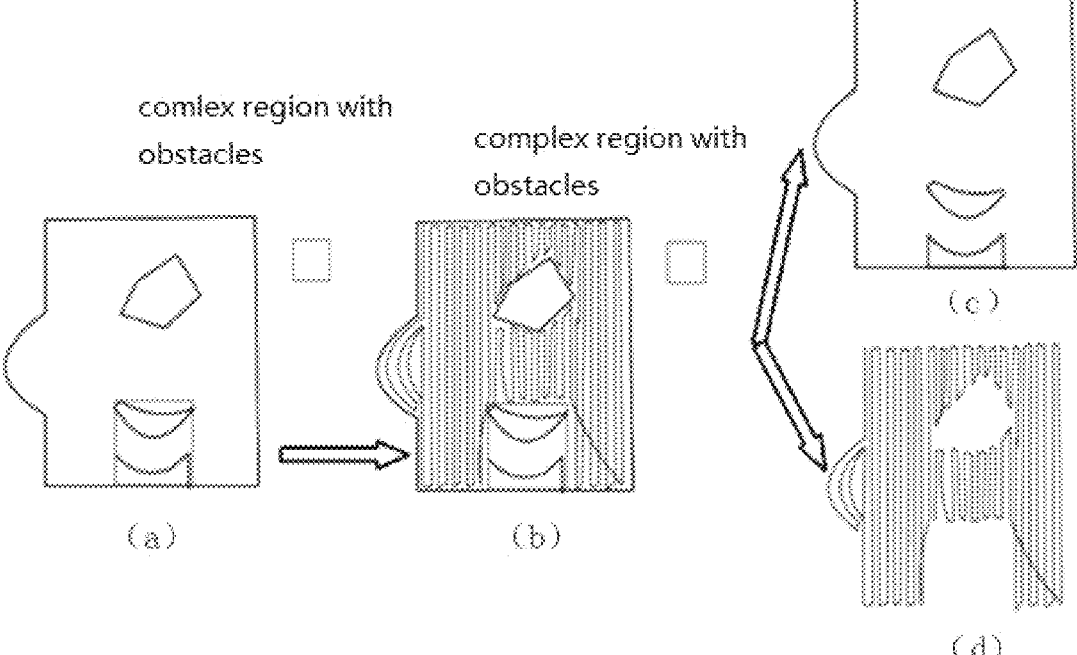

comlex region with obstacles complex region with obstacles (a)     (b)     (c)     (d)

Fig. 4

ROBOT TASK EXECUTION METHOD AND APPARATUS, ROBOT, AND STORAGE MEDIUM

The present application claims the priority of Chinese patent application No. 202110681640.3, filed to the CNIPA on Jun. 18, 2021, and entitled "robot task execution method and apparatus, robot, and storage medium", which is incorporated herein by reference in its entirety.

TECHNICAL FIELD

The present application relates to the field of communications, and in particularly relates to a robot task execution method and apparatus, robot, and storage medium.

BACKGROUND

With the increase of labor costs and the maturation of robot intelligence technology, more and more robots are applied in certain scenarios to solve specific problems. For example, cleaning robots mainly complete cleaning work in households and typical commercial scenarios, the core work content of which is to complete the traversal cleaning of the target scene. The core function of a cleaning robot is reflected in the path planning of the robot, especially the full coverage path planning, which can reflect the intelligence degree and market application prospect of the robot.

At present, the full coverage path planning of cleaning robot mainly adopts the following two methods:

1. based on manual teaching (training) method: the user first teaches (trains) a path that fully covers the target region, and the cleaning robot completely tracks the taught (trained) path to complete the entire coverage cleaning process. Since the robot's walking path is determined by humans, the robot's taught path can easily avoid complex structured scenarios. This solution is generally used in complex structured scenarios, such as shelves, complex obstacles of high-altitude, etc., as shown in FIG. 1.

2. based on boundary full coverage method: first, a boundary is taught (trained), and the cleaning robot performs the full coverage planning autonomously within the envelope region according to the boundary constraints, and the robot completes the cleaning according to the planned path. However, due to the environmental uncertainty of the envelope region for cleaning, it is difficult for robots to complete full-coverage cleaning autonomously in more complex structured scenarios, this solution is usually used in scenarios with relatively simple structures (open lobbies, squares, etc.), as shown in FIG. 2.

The first method is highly adaptable to the environment, but once the teaching (training) is completed, the path cannot be modified, and the duplication of partial regions due to human error would lead to low efficiency, as well as unnecessary wear and tear of cleaning equipment. As for the second method, it is only applicable to scene environments with relatively simple structure, and because of its relatively weak adaptability, the application scenarios thereof are very limited.

SUMMARY

The main purpose of the present application is to disclose a robot task execution method and apparatus, robot, and storage medium, in order to at least solve the problem of low cleaning efficiency, relatively weak adaptability, and limited application scenarios of full-coverage path planning methods in related art.

According to one aspect of the present application, a robot task execution method is provided.

The robot task execution method according to the present application comprises: acquiring a training trajectory and an environment map in a training mode; generating a target region for tasks to be performed by the robot based on the environment map and the training trajectory, wherein, the target region is a maximum envelope region in which the robot can complete the tasks autonomously; controlling the robot to traverse the target region until the robot completes the tasks to be performed.

According to another aspect of the present application, a robot task execution apparatus is provided.

The robot task execution apparatus according to the present application comprises: an acquisition module configured to acquire a training trajectory and an environment map in a training mode; a generation module configured to generate a target region for tasks to be performed by the robot based on the environment map and the training trajectory, wherein the target region is a maximum envelope region in which the robot can complete the tasks autonomously; an execution module configured to control the robot to traverse the target region until the robot completes the tasks to be performed.

According to yet another aspect of the present application, a robot is provided.

The robot according to the present application comprises a memory and a processor, wherein the memory is configured to store computer-executable instructions; the processor is configured to execute computer-executable instructions stored in the memory to cause the robot to perform the any of the methods aforementioned.

According to yet another aspect of the present application, a computer-readable storage medium is provided.

The computer-readable storage medium according to the present application comprises a memory and a processor, wherein the memory is configured to store computer-executable instructions; the processor is configured to execute computer-executable instructions stored in the memory to cause the robot to perform the any of the methods aforementioned.

According to the present application, by acquiring a training trajectory and an environment map in the teaching (training) mode, and automatically generating a target region for tasks (for example, cleaning, floor washing, etc.) to be performed by the robot, wherein the target region is a maximum envelope region in which the robot can complete the tasks autonomously; and controlling the robot to traverse the target region until the robot completes the tasks to be performed, the problem of low efficiency of manual teaching methods, relatively weak adaptability of full-boundary coverage methods, and limited application scenarios, etc. in the related art can be solved, so that the robot can perform tasks stably and efficiently in various environmental regions, thereby being able to be applied to various application scenarios.

BRIEF DESCRIPTION OF THE DRAWINGS

FIG. 3 is a flow chart of the robot task execution method according to an embodiment of the present application;

FIG. 4 is a schematic diagram of acquiring an environment map and training trajectory in the teaching mode according to a preferred embodiment of the present application;

DETAILED DESCRIPTION

The embodiments of the present application and ways in which they can be implemented will be described in detail below with reference to the accompanying drawings.

According to an embodiment of the present application, a robot task execution method is provided.

FIG. 3 is a flow chart of a robot task execution method according to an embodiment of the present application. As shown in FIG. 3, the robot task execution method comprises:

step S301: acquiring a training trajectory and an environment map in a training mode;

step S302: generating a target region for tasks to be performed by the robot based on the environment map and the training trajectory, wherein, the target region is a maximum envelope region in which the robot can complete the tasks autonomously;

step S303: controlling the robot to traverse the target region until the robot completes the tasks to be performed.

Figure 1:
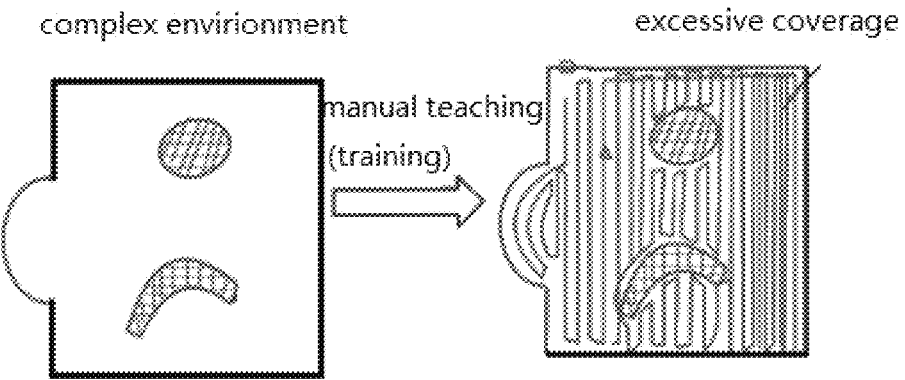
FIG. 1 is a schematic diagram of path planning based on manual teaching methods according to related art.
Figure 2:
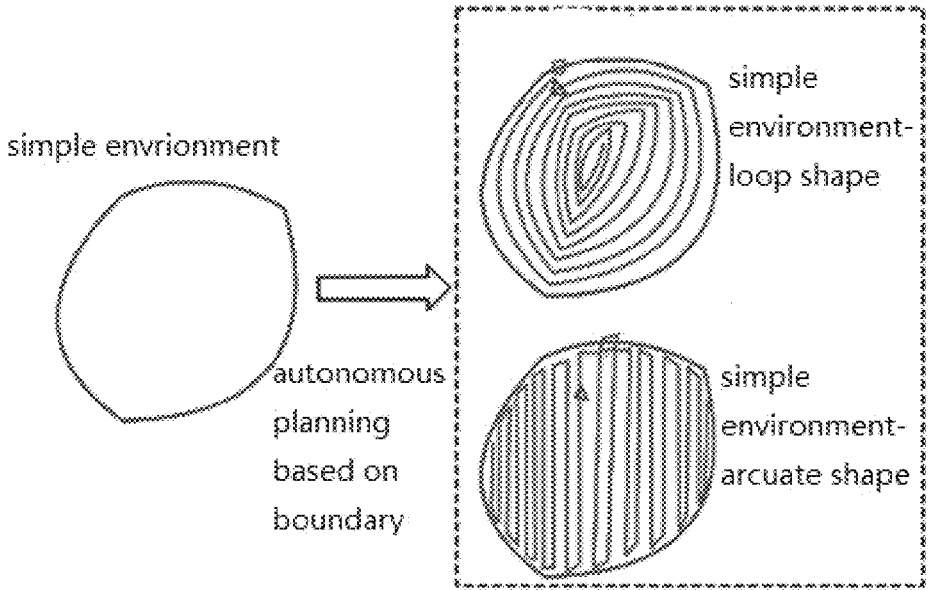
FIG. 2 is a schematic diagram of path planning based on full-boundary coverage methods according to related art.

In the related art, for manual teaching (training) methods, due to human subjectivity, there are a lot of excessive cleaning and missed cleaning in the cleaning region, and therefore the efficiency and stability of this type of method are low. For application scenarios with a complex region containing obstacles (as shown in FIG. 1), based on the full-boundary coverage methods, due to the environmental uncertainty of the envelope region for cleaning, when the method is implemented, the environmental adaptability is weak. By adopting the solution shown in FIG. 1, which comprises first acquiring a training trajectory and an environment map in the teaching (training) mode, then automatically generating a target region for tasks to be performed by a robot (for example, cleaning, floor washing, etc.) based on the training trajectory and the environment map, wherein, the target region is the maximum envelope region where the robot can complete the tasks autonomously; and controlling the robot to traverse the target region until the robot completes the tasks to be performed, the robot can perform tasks stably and efficiently in various environmental regions, thereby being able to be applied to various application scenarios.

Wherein, the above-mentioned environment map may be a world map established based on the world coordinate system, and further the environment map may be in the form of a 2D grid map or a 3D grid map.

Preferably, the step of acquiring a training trajectory and an environment map in a teaching (training) mode may further comprises: when controlling the robot to start moving from an initial position, establishing a world coordinate system based on the initial position, and constructing a world map based on the world coordinate system; during the movement of the robot, recording the training trajectory of the robot, and recording information of at least one target position on the training trajectory and the business operations (e.g. rotation, making movements with arms, water spraying, vacuuming, detouring, turning on corresponding equipment, etc.) corresponding to the information of each target position; binding relevant information in the world map, wherein the relevant information comprises: the training trajectory, the information of at least one target position, and the information of business operation respectively corresponding to each target position, which are the bound to the world map.

In the robot map establishing stage, the robot establishes a world coordinate system based on an initial position O, and constructs a world map based on the world coordinate system. For example, the robot is controlled to start and move from the initial position O (for example, use remote control or other ways to control the movement of the robot), perform partial coverage or traversal coverage of the work scene according to business function requirements, move it to a target position A, and perform the corresponding business operations at the target position A, and in the process of performing the above operations, the robot perceives external information through multiple sensors installed at different positions on the robot, such as radar sensor, visual sensor, infrared sensor, ultrasonic sensor, collision sensor, etc., and maps the data of each sensor vertically to a 2D plane to be filled into the grid map; a 3D grid map can also be constructed according to the height of the robot body, and the 3D grid map can be reduced in dimension and compressed into a 2D grid map when in use. The grid map constructed by the robot is recorded as mapt, and based on the robot's real-time coordinate records, the following items are bound to the constructed map (i.e. mapt): the robot's training trajectory, target position A, and business operations performed during the movement.

In the same way, for multiple target positions such as target position B, target position C, etc., the preceding operations are repeated and the robot is controlled to perform a sequence of operations, such as moving from target position A to target position B, then from target position B to target position C, and then from target position C to other target positions, etc. During the process of performing the preceding operations, the robot constructs an environment map (for example, the above-mentioned world map) based on the target scene, the target positions (such as A, B, C, etc.) can be manually selected based on business requirements, wherein the number of target positions can be greater than 0 and less than or equal to the number of the business requirements.

During the movement of the robot, the training trajectory of the robot can be recorded, for example, the coordinate information of each path point on the training trajectory is recorded into list1; and the information of at least one target position on the training trajectory and the business operation corresponding to each target position are recorded, for example, the coordinate information of target position A and the business operations corresponding to target position A is recorded into list2, wherein the business operation may be recorded in the form of business operation code, etc. And then, list1 and list2 are bound to mapt respectively.

After completing the map establishing of the target scene and recording the training trajectory of the robot, the information of at least one target position on the training trajectory and the business operation respectively corresponding to each target position, the robot is controlled to return to the initial position O.

Preferably, in the step S302, the step of generating a target region for tasks to be performed by the robot may further comprise: expanding the training trajectory within the environment map to obtain a maximum envelope region in which the robot can complete the tasks autonomously.

In a preferred embodiment, the step of expanding the training trajectory within the environment map (taking a grid map as an example) to obtain the maximum envelope region in which the robot can complete the tasks autonomously may further comprise: importing grid information of M layers of grids on a left side of the training trajectory and N layers of grids on a right side of the training trajectory into a newly established coverage region map, wherein, the one-time coverage width of the robot is equal to M+N+1, M and N are both integers greater than or equal to 1; extracting an inner envelope and an outer envelope of the coverage region within the coverage region map and overlaying an inward expandable region of the inner envelope and an outward expandable region of the outer envelope, thereby acquiring the maximum envelope region in which the robot can complete the tasks autonomously.

Wherein, the above M may be equal to N, or M may also be not equal to N, and when M is equal to N, it means that the grid region expanded to the left side and the grid region expanded to the right side along the training trajectory is symmetrical, that is, the number of the grid layers expanded to the left side of the training trajectory is equal to the number of grid layers expanded to the right side of the training trajectory; for example, if the one-time coverage width of the robot is equal to W, according to W=M+N+1, it can be known that M=N=(W−1)/2. When M is not equal to N, it means that the grid region expanded to the left side and the grid region expanded to the right side along the training trajectory is asymmetric, that is, the number of grid layers expanded to the left side of the training trajectory is not equal to the number of grid layers expanded to the right side of the training trajectory.

For example, take a small household sweeping machine (can also have mopping function) as an example to illustrate. For the small household sweeping machine, the virtual arrow keys in the app can usually be used to control the movement of the robot so as to complete the traversal sweeping of the entire target region, so as to acquire the environmental map and training trajectory of the target region for sweeping. As shown in FIG. 4, wherein Figure (a) shows the target environment that needs to be swept, wherein the target environment contains a complex region with obstacles. Figure (b) shows the trajectory of using the app to control the small sweeping machine to complete the traversal sweeping. It can be seen that the teaching (training) trajectory completely avoids the complex region with obstacles, and finally the grid map shown in Figure (c) and the training trajectory shown in Figure (d) are acquired.

Figure 5:
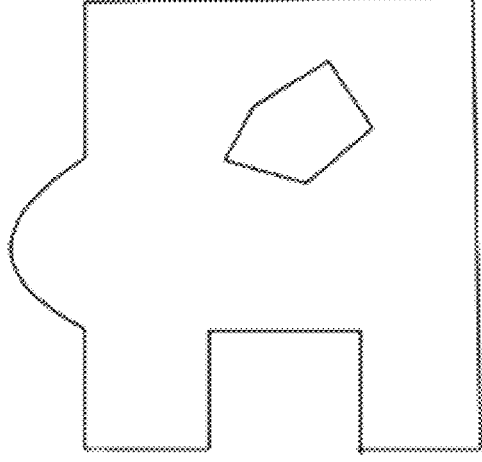
FIG. 5 is a schematic diagram of a target region of a task to be performed according to a preferred embodiment of the present application.

Afterwards, the training trajectory is expanded based on the grid map and the teaching (training) trajectory, so as to acquire the maximum envelope region where the robot can autonomously complete the tasks, as shown in FIG. 5.

Specifically, the number of grid layers that need to be expanded is determined for each training trajectory on the grid map, for example, if the one-time coverage width of the robot is equal to a width of M+N+1 layers of grids, the training trajectory is expanded to the left by M layers of grids and to the right by N layers of grids respectively. The grids in the expanded region is taken as the virtual expansion grids of the training trajectory, the information of the virtual expansion grids of the training trajectory is imported into the newly constructed coverage region map (i.e. covermap), an inner envelope and an outer envelope of the coverage region are extracted in the aforementioned covermap, and the inward expandable region of the inner envelope and the outward expandable region of the outer envelope are overlaid, so as to finally acquire the maximum envelope region in which the robot can complete the tasks autonomously. As shown in FIG. 5, the maximum envelope region completely covers the sweeping region, and excludes the complex regions with obstacles, wherein the robot cannot complete tasks autonomously in the exclude regions.

Preferably, after generating the target region for tasks to be performed by the robot in step S302, the following processing may also be included: determining the boundary of the target region, and setting restriction fences on the boundary of the target region, wherein the robot performs tasks within the target region enclosed by the restriction fences.

Figure 6:
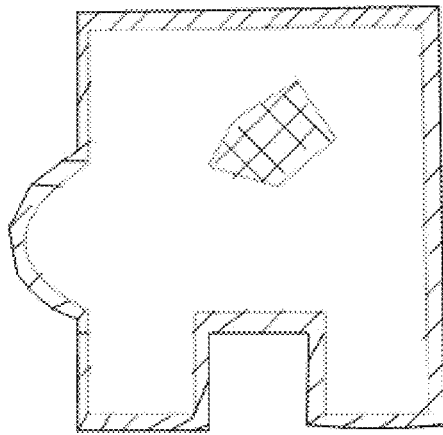
FIG. 6 is a schematic diagram of a restricted area and the boundary of the target region according to a preferred embodiment of the present application.

In the implementation of preferred embodiment, when the robot autonomously navigates and bypasses obstacles, the robot is not required to pass through certain regions, for example, it is not necessary for the robot to pass through the carpet region when performing the mopping task. For example, as shown in FIG. 5, the target region is a joint cleaning area, when the robot is not required to pass through certain regions (i.e., the restricted area), it is necessary to set up restriction fences at the outer boundary of the target region and within the restricted area (the shaded part as shown in FIG. 6), and in this way, the robot can be prevented from exceeding the working region when performing tasks. It should be noted that, since the robot will not pass through the restricted area (such as carpet, complex region, and a region prone to falling) during manual teaching, the corresponding range of restricted area can be determined based on the training trajectory, thereby ensuring that the robot will not pass through these regions.

Preferably, in step S303, the step of controlling the robot to traverse the target region to perform the tasks until the robot completes the tasks may further comprise dividing the target region into multiple sub-regions; controlling the robot to traverse each of the sub-regions to perform tasks until the robot completes the tasks to be performed in the target region.

Figure 7:
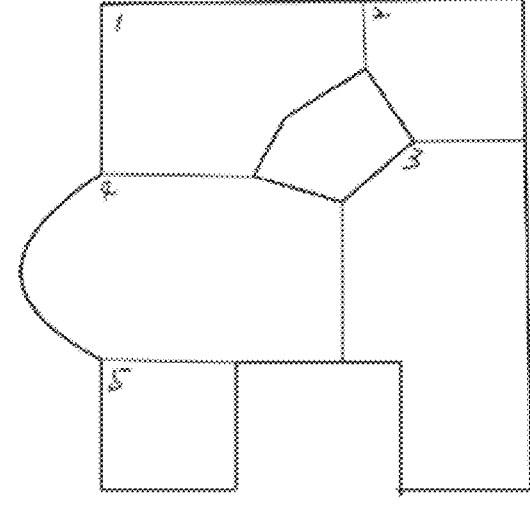
FIG. 7 is a schematic diagram of divided sub-regions according to a preferred embodiment of the present application.

In the implementation of preferred embodiment, when the target region still has a complex contour, in order to facilitate the robot to perform tasks stably and efficiently (for example, sweeping, mopping, etc.), the complex contour can be transformed into multiple simpler contours, for example, the target region can be partitioned to obtain multiple sub-regions. For example, for the target region shown in FIG. 5, the entire target region can be divided into five sub-regions, as shown in FIG. 7.

The method of intelligent partitioning can be as follows: dividing the environmental grid map into multiple grid regions, and the adjacent grid regions are partially overlapping; finding intersecting line segments in each grid region, and determining the candidate regions based on the intersecting line segments; and merging the candidate regions that fall into the overlap of grid regions to obtain the result of sub-region division.

Intelligent partitioning can also be implemented using the existing BCD (boustrophedon cellular decomposition) algorithm, BCD is a division method of grid map that automatically partitions the entire target sweeping region, and the partition result can be traversed by a boustrophedon path, and can also be traversed by a loop path.

Preferably, the step of traversing each of the sub-regions to perform the tasks until the robot completes the tasks to be performed in all target regions may further comprise: determining a sequence of sub-regions for the robot to perform tasks in each of the sub-regions; controlling the robot to traverse the sub-regions one by one according to the determined sequence until the robot completes the tasks to be performed in all the sub-regions.

After dividing the target region into multiple sub-regions, the robot may be controlled to traverse each of the sub-regions to perform tasks until the robot completes the tasks to be performed in the target region. Of course, for multiple robots, tasks can be traversed and performed independently in each sub-region in parallel, thereby improving the efficiency of task execution. Preferably, the robot can also be controlled to traverse each sub-region one by one to perform the tasks, that is, after traversing and completing the tasks in one sub-region, then the robot traverses and completes the tasks in the next sub-region. A sequence of the sub-regions in which the robot performs tasks may be determined first; then the robot is controlled to traverse the sub-regions one by one according to the determined sequence until the robot completes the tasks to be performed in all the sub-regions. For example, a starting position for the robot to perform the tasks is first determined, then which sub-regions are the most adjacent to the starting position is determined, and then based on the minimum distance from the starting position to each of these sub-regions, the sequence of the sub-regions that the robot passes through when performing the tasks is determined. The sequence of task execution corresponding to each sub-region can also be determined according to either a clockwise direction or a counter-clockwise direction.

Preferably, the step of controlling the robot to traverse each of the sub-regions to perform tasks until the robot completes the tasks to be performed in the target region may further comprise:

S1: determining a nearest sub-region relative to the robot based on information of an initial position of the robot;

S2: controlling the robot to traverse the nearest sub-region to perform tasks;

S3: after completing the task in the nearest sub-region, determining the positioning information of an end point where the robot completes the tasks, and determining the next nearest sub-region relative to the end point;

S4: executing the steps S2 to S3 in a loop until the robot completes the tasks to be performed in all the sub-regions of the target region.

For example, the sorting method adopts the nearest neighbor principle, after cleaning a region, the nearest region to the robot is selected as the next sub-region according to the current position of the robot (it can be that the boundary of the sub-region is nearest to the current position of the robot, or it can be that the corner points of the sub-region is nearest to the current position of the robot).

Specifically, the grid points of the boundary for the sub-regions in which the robot has not performed tasks may be determined, then each of the grid points (including the corner points of the sub-regions) of the boundary are traversed, and then the distance from each of the grid points of the boundary to the above-mentioned end point is calculated, for example, the coordinate of the end point in the map based on the world coordinate system is X, the coordinate of a grid point of the boundary in the map based on the world coordinate system is Y(i), $\|Y(i)—X\|$ represents the norm between Y(i) and X, that is, the Euclidean distance, wherein i is a natural number. The sub-region to which the nearest grid point of the boundary belongs is selected as the next sub-region; if there are multiple grid points of the boundary nearest to the above end point, the sub-region to which one of the grid points of the boundary belongs can be randomly selected as the next sub-region, or, according to the direction for performing the tasks (for example, clockwise or counterclockwise, etc.), a sub-region is selected from multiple sub-regions that satisfy the condition as the next sub-region.

Figure 8:
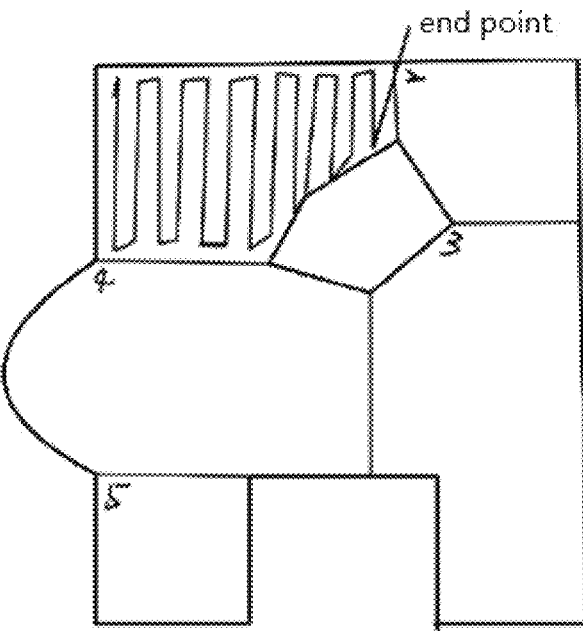
FIG. 8 is a schematic diagram of a robot traversing sub-regions to perform tasks according to a preferred embodiment of the present application.

As shown in FIG. 8, after completing sweeping in the sub-region numbered 1, the robot is at the end point position shown in the figure, since the boundary of the sub-region numbered 2 on the upper right side is nearest to the end point in FIG. 8, the robot is controlled to traverse the above-mentioned sub-region numbered 2 to perform tasks after traversing the sub-region numbered 1. By executing the above steps in a loop, each sub-region in the target region is traversed, thereby completing the tasks within the entire target region with complex contour.

Figure 9:
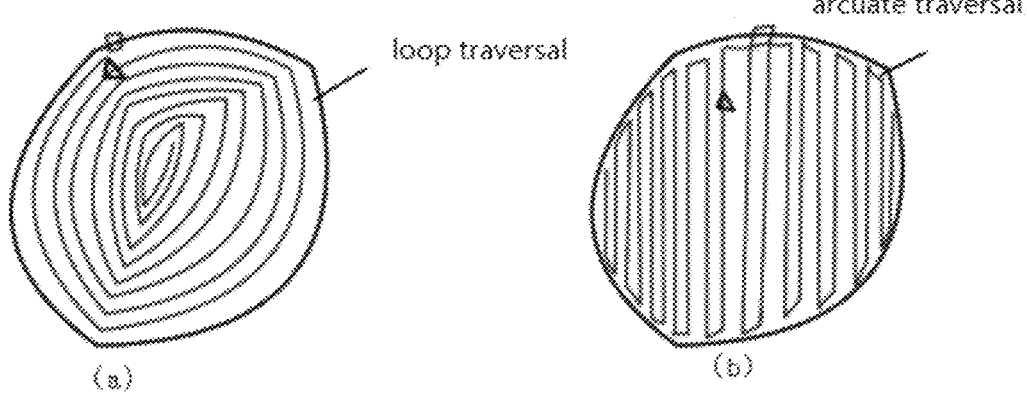
FIG. 9 is a schematic diagram of two traversal modes in the sub-regions according to a preferred embodiment of the present application.

Preferably, before controlling the robot to traverse the target region, it is necessary to determine and select the traversal mode first, for example, as shown in part (a) of FIG. 9, the loop traversal mode may be selected, while the arcuate traversal mode may also be selected as shown in part (b) of FIG. 9, or a mixed traversal mode may be selected, for example, the sub-regions numbered 1, 2, 3, and 5 in FIG. 8 adopt the arcuate traversal mode, and the sub-region numbered 4 in FIG. 9 adopts the loop traversal method Preferably, before generating the target region for tasks to be performed by the robot in step S302, the following processing may also be included: receiving a first request instructing the robot to autonomously traverse the target region; and loading the world map and the relevant information bound to the world map. In step S303, the step of controlling the robot to traverse the target region until the robot completes the tasks to be performed may further comprise: re-executing a traversing-type path planning within the target region; and the robot autonomously tracking a path planned by the traversing-type path planning, and for each target position among at least one target position, the robot performing the business operation corresponding to the target position when the robot reaches the target position.

In the implementation of preferred embodiment, when the robot needs to autonomously traverse the target region, the robot receives a first request instructing the robot to autonomously traverse the target region; the robot loads the world map such as mapt (for example, a 2D grid map) constructed for the target scene and the following items bound to the above world map: the training trajectory, the information of at least one target position and the business operation respectively corresponding to each target position (for example, list1 and list2 bound to mapt), first, on the basis of mapt, the training trajectory of the robot in the process of map establishing is expanded based on the horizontal dimensions of the robot itself and combined (for example, a one-time coverage width of the robot, etc.) to form a coverage region map covermap in the process of robot map establishing, and an inner envelope and an outer envelope of the coverage region map (i.e. covermap) are extracted, after overlaying the robot's expandable expansion region (for example, the inward expandable region of the inner envelope and the outward expandable region of the outer envelope), the final coverage region map covermap for the robot is formed.

The robot performs traversal path planning based on the coverage region map (i.e. covermap), wherein the path planning modes include: one-time full-map path planning and real-time local path planning. After re-executing the traversing-type path planning, the path planning trajectory of the robot coverage region map is acquired. According to the robot's operating mode, path planning may include: loop traversal mode, arcuate traversal mode, and mixed traversal mode (wherein some regions adopt loop traversal mode, and some regions adopt arcuate traversal mode).

The robot automatically drives itself to move based on the trajectory obtained by the traversing-type path planning, since the information of at least one target position and the business operation respectively corresponding to each target position are both bound to the world map, for each target position among the at least one target position bound to the world map, the robot performs the business operation corresponding to the coordinate information of the target position when the robot reaches the target position. For example, the business operation corresponding to the coordinate information of the target position A is to rotate one circle, thus, when the robot reaches the target position A, the robot performs the business operation of rotating one circle. After the robot finally completes full coverage of the target region, the robot is controlled to return to the initial point. During the process of autonomously traversing the full coverage of the target region, the robot continuously updates the current environment map in real time, so that the environment map reflects the actual situation of the current scene.

In the implementation of preferred embodiment, the step of recording the training trajectory of the robot may further comprise: sequentially recording the position information of each path point on the training trajectory of the robot according to a temporal sequence in which the robot traverses the path points; the step of re-executing a traversing-type path planning within the target region may further comprise: dividing multiple target points into a set of target points respectively to obtain at least one set of target points for all target points corresponding to the information of at least one target position, according to a distance between the target points on the training trajectory and/or the information of association between the business operation respectively corresponding to each target position, and determining a traversal sequence for target points in each set of target points among the at least one set of target points according to the temporal sequence; when re-executing the traversing-type path planning, performing point-to-point path planning on the target points in each set of target points according to the traversal sequence for target points in each set of target points, or maintaining the training trajectory corresponding to each set of target points and the traversal sequence for target points in each set of target points in a re-planned path.

It should be noted that, during the specific implementation process of the robot, the business operations corresponding to information of certain target positions are a series of operations that need to be executed coherently, and if the logic of these business operations is not taken into consideration, the business logic of the robot performing the tasks may be disrupted. For example, at target position 1, the robot needs to perform the business operation of turning on the water spray device, and then at target position 2, target position 3, and target position 4, the robot needs to perform the business operation of water spraying continuously. If the path planning is not carried out in accordance with the sequence of the above business logic, there is no guarantee that the robot can successfully complete the tasks. Therefore, corresponding policies can be set to ensure that the business logic of the robot performing the tasks is not disrupted.

Preferably, the step of dividing multiple target points into a set of target points respectively according to a distance between the target points on the training trajectory and/or the information of association between the business operation respectively corresponding to each target position comprises:

determining distances between every two closest target points on the training trajectory respectively for all target points corresponding to the information of at least one target position, and when the distances between every two closest target points among a plurality of adjacent target points are all less than a first predetermined distance threshold, classifying the plurality of adjacent target points to be target points that satisfy a first predetermined condition;

disassembling the business function of the robot to obtain at least one business operation, for example, the robot's water spray function can be disassembled into business operations such as turning on the water spray device and then performing water spray operations; dividing the business operations with association relationship into the same business function group, establishing a first business function library including one or more business function groups in advance, matching the recorded business operations respectively corresponding to each target position with the first business function library, performing grouping on the business operations corresponding to each target position according to a result of the matching, classifying target points that correspond to target positions corresponding to business operations that are determined to belong to the same business function group after the grouping to be target points that satisfy a second predetermined condition;

dividing the target points that satisfy the first predetermined condition and/or satisfy the second predetermined condition into a set of target points.

That is, three solutions may be adopted: in solution 1, for all target points corresponding to the at least one target position, multiple target points that satisfy the first predetermined condition can be divided into a set of target points according to the distance between the target points on the training trajectory; for example, among multiple adjacent target points 1, 2, 3, 4, if the distances between every two closest target points are all less than the first predetermined distance threshold, the multiple adjacent target points 1, 2, 3, and 4 are divided into the same set of target points, and the traversal sequence of each target point in the set of target points 1, 2, 3, and 4 is determined according to the sequence in which the robot initially traverses these target points on the training trajectory; when re-executing the traversing-type path planning, for this set of target points, if the above traversal sequence is: target point 1, target point 2, target point 3, target point 4, then point-to-point path planning is performed for target points 1, 2, 3, and 4 according to this traversal sequence, that is, first planning the path from target point 1 to target point 2, then planning the path from target point 2 to target point 3, and then planning the path from target point 3 to target point 4; or, in the re-planned path, the original training trajectory consisting of the target points 1, 2, 3, and 4 is maintained, and the traversal sequence of this path is also maintained, that is, still starting from target point 1 to target point 2, then to target point 3, and finally to target point 4, rather than a reversed traversal sequence or any other traversal sequence.

In solution 2, according to the information of association between the business operation respectively corresponding to each target position, multiple target points that satisfy the second predetermined condition among all target points are divided into a set of target points; for example, when the recorded multiple business operations 1, 2, 3, and 4 are matched with the pre-established first business function library, business operations 1, 3, and 4 have a certain correlation relationship and are matched into the same business function group, the target points corresponding to the target positions corresponding to the business operations 1, 3 and 4 are determined as target points that satisfy the second predetermined condition, and these target points are divided into a set of target points. When re-executing the traversing-type path planning, for this set of target points, if the above traversal sequence is: target point 1, target point 3, target point 4, then the point-to-point path planning will be executed for target points 1, 3, and 4 according to this traversal sequence, that is, first planning the path from target point 1 to target point 3, and then planning the path from target point 3 to target point 4; or, in the re-planned path, the original path segment of the train trajectory consisting of the target points 1, 3, and 4 is maintained and the traversal sequence of this path segment is also maintained, that is, starting from target point 1 to target point 3, and then to target point 4, rather than a reversed traversal sequence or any other traversal sequence.

In solution 3: multiple target points that satisfy both the first predetermined condition and the second predetermined condition are divided into the same set of target points, that is, selecting the intersection of the target points satisfying the first predetermined condition and the target points satisfying the second predetermined condition. It should be noted that, for solution 1, if only considering the distance between target points on the training trajectory, while not considering the information of association between business operations, there may be some errors in grouping. Similarly, for solution 2, if only considering the information of association between business operations, while not considering the distance between target points on the training trajectory, there may also be some errors in grouping. If the two strategies are combined, that is, solution 3 is adopted, by dividing the target points that satisfy both the first predetermined condition and the second predetermined condition into a set of target points, grouping errors can be reduced as much as possible.

It can be seen that, in the stage of controlling the movement of robot to establish the environment map, the information of the robot, such as the training trajectory, the business operations, and the target positions, can be bound to the environment map to form information sets. When the robot needs to autonomously traverse the target region, the robot may load the above information sets, expand the training trajectory, and obtain the maximum envelope region in which the robot can complete the tasks autonomously. Specifically, the robot may imports the information of the expanded coverage region into the newly constructed coverage region map, and extracts the inner envelope and the outer envelope of the coverage region of the coverage region map, and after overlaying the robot expandable region, the robot acquires the final coverage region map, and by re-executing the path planning within the coverage range of the coverage region map, the optimal path coverage trajectory is obtained, and in this way, the problem of repeated coverage can be prevented. The robot autonomously tracks the path obtained by the traversing-type path planning, and for a target position with business operation corresponding thereto, the robot performs the business operation corresponding to the target position when the robot reaches the target position. Thus, the entire business logic for the robot to traverse the full coverage of the target region is realized.

Preferably, after acquiring the training trajectory and the environment map in a training mode, the following processing may also be included: receiving a second request instructing the robot to autonomously traverse the target positions; loading the world map and the relevant information bound to the world map; identifying one or more target positions that the robot needs to autonomously traverse and that correspond to the second business request; adding the one or more target positions and the business operations corresponding to the one or more target positions into a to-be-executed list; performing path planning on target points corresponding to each target position in the to-be-executed list to obtain a motion trajectory for the robot to traverse the target positions; the robot tracking the motion trajectory planned by the path planning, and when the robot reaches each of the one or more target positions, the robot performing business operations corresponding to each of the one or more target positions.

In the implementation of preferred embodiment, when the robot needs to autonomously traverse the target positions, the robot receives a second request instructing the robot to autonomously traverse the target positions; and the robots loads the constructed map of the target scene (for example, the above-mentioned world map) and the relevant information bound to the world map, wherein the relevant information comprises: the training trajectory, the information of at least one target position, and the information of business operation respectively corresponding to each target position. Then it is necessary to identify one or more target positions that the robot needs to autonomously traverse and that correspond to the second business request, for example, based on business requirements, one or more target positions that need to be traversed can be manually selected or autonomously selected by the robot, and the robot adds the one or more target positions and the business operations corresponding to the one or more target positions into a to-be-executed list, wherein the robot performs path planning on the target points corresponding to each target position in the to-be-executed list to obtain a motion trajectory for the robot to traverse the target positions, for example, based on the sequence formed by the target positions in the to-be-executed list, the robot may perform point-to-point path planning according to the map of the target scene, or, the robot may perform tracking planning based on the training trajectory recorded in the map establishing stage to obtain the motion trajectory for the robot.

The robot can be automatically derived to move based on the motion trajectory obtained by the above-mentioned path planning, since the information of at least one target position and the business operation respectively corresponding to each target position are both bound to the world map, for each target position among the at least one target position bound to the world map, the robot performs the business operation corresponding to the coordinate information of the target position when the robot reaches the target position. For example, the business operation corresponding to the coordinate information of the target position B is to raise the right arm, thus, when the robot reaches the target position B, the robot performs the business operation of raising the right arm. After the robot finally completes the traversal of all the target positions, the robot is controlled to return to the initial point. During the process of autonomously traversing the target positions, the robot continuously updates the current environment map in real time, so that the environment map reflects the actual situation of the current scene.

Preferably, the step of recording the training trajectory of the robot may further include the following processing: sequentially recording the position information of each path point on the training trajectory of the robot according to a temporal sequence in which the robot traverses the path points; then the step of performing path planning on the target points corresponding to each target position in the to-be-executed list to obtain the motion trajectory for the robot to traverse the target positions includes the following processing: dividing multiple target points into a set of target points respectively to obtain at least one set of target points for the target points corresponding to each target position in the to-be-executed list according to a distance between the target points on the training trajectory and/or according to information of association between business operation respectively corresponding to each target position in the to-be-executed list, and determining a traversal sequence for the target points in each set of target points among the at least one set of target points according to the temporal sequence; when performing the path planning, for each set of target points among all the divided sets of target points, performing point-to-point path planning on each target point according to the traversal sequence for target points in each set of target points, or maintaining the training trajectory corresponding to each set of target points among all the sets of target points and the traversal sequence for target points in each set of target points in a planned path.

Preferably, the step of dividing multiple target points into a set of target points respectively for the target points corresponding to each target position in the to-be-executed list according to the distance between the target points on the training trajectory and/or according to information of association between business operation corresponding to each target position in the to-be-executed list may further comprise:

determining distances between every two closest target points on the training trajectory respectively for the target points corresponding to each target position in the to-be-executed list, and when the distances between every two closest target points among a plurality of adjacent target points are all less than a second predetermined distance threshold, classifying the plurality of adjacent target points to be target points that satisfy a third predetermined condition;

disassembling business functions of the robot to obtain at least one business operation, dividing business operations with association relationship into the same business function group, establishing a second business function library including one or more business function groups in advance, matching the business operation respectively corresponding to each target position in the to-be-executed list with the second business function library, performing grouping on the business operation respectively corresponding to each target position in the to-be-executed list according to a result of the matching, and classifying target points that correspond to target positions corresponding to business operations that are determined to belong to the same business function group after the grouping to be target points that satisfy a fourth predetermined condition;

dividing the target points that satisfy the third predetermined condition and/or satisfy the fourth predetermined condition into a set of target points.

Similarly, during the specific implementation process of the robot, the business operations corresponding to information of certain target positions are a series of business operations that need to be executed coherently, therefore, in order to prevent the business logic of the robot performing the tasks from being disrupted, corresponding strategies can be set.

For example, three solutions may be adopted:

in solution 1, for the target points corresponding to each target position in the to-be-executed list, according to a distance between the target points on the training trajectory, multiple target points that satisfy the third predetermined condition are divided into a set of target points;

in solution 2, according to the information of association between the business operation respectively corresponding to each target position in the to-be-executed list, multiple target points that satisfy the fourth predetermined condition are divided into a set of target points;

in solution 3: multiple target points that satisfy both the third predetermined condition and the fourth predetermined condition are divided into the same set of target points, that is, selecting the intersection of the target points satisfying the third predetermined condition and the target points satisfying the fourth predetermined condition. It should be noted that, for solution 1, if only considering the distance between target points on the training trajectory, while not considering the information of association between business operations, there may be some errors in grouping. Similarly, for solution 2, if only considering the information of association between business operations, while not considering the distance between target points on the training trajectory, there may also be some errors in grouping. If the two strategies are combined, that is, solution 3 is adopted, by dividing the target points that satisfy both the third predetermined condition and the fourth predetermined condition into a set of target points, grouping errors can be reduced as much as possible.

According to an embodiment of the present application, a robot task execution apparatus is also provided.

Figure 10:
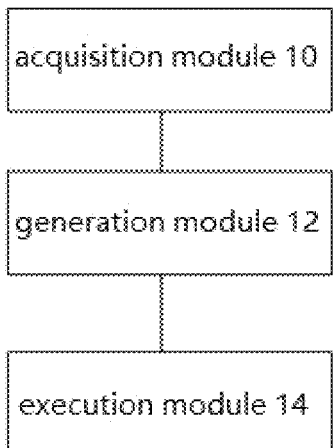
FIG. 10 is a structural block diagram of a robot task execution apparatus according to an embodiment of the present application.

FIG. 10 is a structural block diagram of a robot task execution apparatus according to an embodiment of the present application. As shown in FIG. 10, the robot task execution apparatus according to the embodiment of the present application comprises: an acquisition module 10 configured to acquire a training trajectory and an environment map in a training mode; a generation module 12 configured to generate a target region for task to be performed by the robot based on the environment map and the training trajectory, wherein the target region is a maximum envelope region in which the robot can complete the task autonomously; an execution module 14 configured to control the robot to traverse the target region until the robot completes the task to be performed.

Preferably, the execution module 14 may further comprise: a dividing unit 140 (not shown in FIG. 10) configured to divide the target region into multiple sub-regions; a control unit 142 (not shown in FIG. 10) configured to control the robot to traverse each of the sub-regions to perform tasks until the robot completes the tasks to be performed in the target region.

It should be noted that the preferred implementation ways of the combination of each module and each unit in the robot task execution apparatus can be specifically referred to the descriptions of FIGS. 1 to 9, wherein the implementation ways and the principle thereof are the same, which will not be described again herein.

According to an embodiment of the present application, a robot is also provided.

The robot according to the present application comprises: a memory and a processor, wherein the memory is configured to store computer-executable instructions; the processor is configured to execute computer-executable instructions stored in the memory to cause the robot to perform the tasks according to any of the methods provided by the above embodiments. The details can be referred to the descriptions of FIGS. 1 to 9, wherein the implementation ways and the principle thereof are the same, which will not be described again herein.

According to an embodiment of the present application, a computer-readable storage medium is also provided.

The computer-readable storage medium according to the present application has computer-executable instructions stored therein, and the computer-executable instructions, when executed by a processor, cause the processor to perform the tasks according to any of the methods provided by the above embodiments.

The storage medium containing computer-executable instructions in the embodiments of the present application can be used to store computer-executable instructions for performing the robot task execution methods of the above embodiments, and the details can be referred to the descriptions of FIGS. 1 to 9, wherein the implementation ways and the principle thereof are the same, which will not be described again herein.

In summary, by means of the above embodiments provided by the present application, based on the training path and the grid map, the maximum envelope region (i.e., the target region) in which the robot can complete the tasks autonomously is generated, after the target region is intelligently partitioned, the task execution sequence of the intelligently partitioned regions is sorted, and then the traversal mode suitable for each region (for example, arcuate traversal mode or loop traversal mode, etc.) is automatically selected, on this basis, multiple scattered target regions can be merged, the merged target region is then divided into multiple independent sub-regions to realize the design idea of converting a whole into fractions and then converting fractions into a whole. And as a result, the robot can perform tasks (for example, disinfection, sweeping, mopping, etc.) stably and efficiently in regions with various environments (for example, environmental regions with complex structures), thereby being able to be applied to various application scenarios.

Moreover, in the stage of controlling robot movement to establish an environment map, information such as the robot's training trajectory, robot business operations, and robot target positions can be bound to the environment map to form an information set. When the robot needs to autonomously traverse the target region, the robot can load the above information set, and based on the above solution of acquiring the maximum envelope region in which the robot can complete the tasks autonomously, the path planning can be re-executed within the maximum envelope region to obtain the optimal path coverage trajectory, which can prevent the problem of repeated coverage. Moreover, when the robot needs to autonomously traverse the target position, based on the target position and business operation logic, the robot can perform point-to-point path planning on the scene map or perform trajectory tracking planning based on the motion trajectory during the map establishing stage to obtain the robot's motion trajectory.

In addition, during the robot's autonomous movement, the robot can also update the environment map in real time and plan the motion trajectory in real time based on the updated information of the environment map.

The above disclosures are only a few specific embodiments of the present application, but the present application is not limited thereto, any changes that can be thought of by a person skilled in the art should fall within the scope of the present application.

What is claimed is:

1. A robot task execution method, wherein, the robot task execution method comprises:

acquiring a training trajectory and an environment map in a training mode;

generating a target region for tasks to be performed by a robot based on the environment map and the training trajectory, wherein, the target region is a maximum envelope region in which the robot can complete the tasks autonomously;

controlling the robot to traverse the target region until the robot completes the tasks to be performed;

wherein, the step of generating a target region for tasks to be performed by the robot comprises: expanding the training trajectory within the environment map to obtain the maximum envelope region in which the robot can complete the tasks autonomously;

wherein, the step of expanding the training trajectory within the environment map to obtam the maximum envelope region in which the robot can complete the tasks autonomously comprises:

importing grid information of M layers of grids on a left side of the training trajectory and N layers of grids on a right side of the training trajectory into a newly established coverage region map, wherein, a one-time coverage width of the robot is equal to M+N+1, M and N are both integers greater than or equal to 1;

extracting an inner envelope and an outer envelope of a coverage region within the coverage region map, overlaying an inward expandable region of the inner envelope and an outward expandable region of the outer envelope, thereby obtaining the maximum envelope region in which the robot can complete the tasks autonomously.

2. The method according to claim 1, wherein, the step of acquiring a training trajectory and an environment map in a training mode comprises:

when controlling the robot to start moving from an initial position, establishing a global coordinate system based on the initial position, and constructing a global map based on the global coordinate system;

during the movement of the robot, recording the training trajectory of the robot, and recording information of at least one target position on the training trajectory and information of business operation respectively corresponding to each target position;

binding relevant information in the global map, wherein the relevant information comprises: the training trajectory, the information of at least one target position, and the information of business operation respectively corresponding to each target position, which are bound to the global map.

3. The method according to claim 2, wherein, before the step of generating a target region for tasks to be performed by the robot, the method further comprises: receiving a first request instructing the robot to autonomously traverse the target region; and loading the global map and the relevant information bound to the global map;

the step of controlling the robot to traverse the target region until the robot completes the tasks to be performed comprises: re-executing a traversing-type path planning within the target region; and the robot autonomously tracking a path planned by the traversing-type path planning, and for each target position among the at least one target position, the robot performing the business operation corresponding to the target position when the robot reaches the target position.

4. The method according to claim 3, wherein, the step of recording the training trajectory of the robot comprises: sequentially recording the position information of each path point on the training trajectory of the robot according to a temporal sequence in which the robot traverses the path points;

the step of re-executing a traversing-type path planning within the target region comprises:

for all target points corresponding to the information of at least one target position, dividing multiple target points into a set of target points respectively to obtain at least one set of target points, according to a distance between the target points on the training trajectory and/or according to information of association between the business operation respectively corresponding to each target position, and determining a traversal sequence for target points in each set of target points among the at least one set of target points according to the temporal sequence; when re-executing the traversing-type path planning, performing point-to-point path planning on the target points in each set of target points according to the traversal sequence for target points in each set of target points, or maintaining the training trajectory corresponding to each set of target points and the traversal sequence for target points in each set of target points in a re-planned path.

5. The method according to claim 4, wherein, the step of dividing multiple target points into a set of target points respectively, for all target points corresponding to the information of at least one target position, according to a distance between the target points on the training trajectory and/or according to information of association between the business operation respectively corresponding to each target position comprises:

determining distances between every two closest target points on the training trajectory respectively for all target points corresponding to the information of at least one target position, and when the distances between every two closest target points among a plurality of adjacent target points are all less than a first predetermined distance threshold, classifying the plurality of adjacent target points to be target points that satisfy a first predetermined condition;

disassembling business functions of the robot to obtain at least one business operation, dividing business operations with association relationship into the same business function group, establishing a first business function library including one or more business function groups in advance, matching the recorded business operation respectively corresponding to each target position with the first business function library, performing grouping on the business operation respectively corresponding to each target position according to a result of the matching, and classifying target points that correspond to target positions corresponding to business operations that are determined to belong to the same business function group after the grouping to be target points that satisfy a second predetermined condition; and dividing the target points that satisfy the first predetermined condition and/or satisfy the second predetermined condition into a set of target points.

6. The method according to claim 2, wherein, after the step of acquiring a training trajectory and an environment map in a training mode, the method further comprises:

receiving a second request instructing the robot to autonomously traverse target positions;

loading the global map and the relevant information bound to the global map;

identifying one or more target positions that the robot needs to autonomously traverse and that correspond to the second business request;

adding the one or more target positions and business operations corresponding to the one or more target positions into a to-be-executed list;

performing path planning on target points corresponding to each target position in the to-be-executed list to obtain a motion trajectory for the robot to traverse the target positions;

the robot tracking the motion trajectory planned by the path planning, and when the robot reaches each of the one or more target positions, the robot performing business operations corresponding to each of the one or more target positions.

7. The method according to claim 6, wherein, the step of recording the training trajectory of the robot comprises: sequentially recording the position information of each path point on the training trajectory of the robot according to a temporal sequence in which the robot traverses the path points;

the step of performing path planning on target points corresponding to each target position in the to-be-executed list to obtain the motion trajectory for the robot to traverse the target positions comprises:

dividing multiple target points into a set of target points respectively to obtain at least one set of target points, for the target points corresponding to each target position in the to-be-executed list, according to a distance between the target points on the training trajectory and/or according to information of association between business operation respectively corresponding to each target position in the to-be-executed list, and determining a traversal sequence for target points in each set of target points among the at least one set of target points according to the temporal sequence;

when performing the path planning, for each set of target points among all the divided sets of target points, performing point-to-point path planning on each target point according to the traversal sequence for target points in each set of target points, or maintaining the training trajectory corresponding to each set of target points among all the sets of target points and the traversal sequence for target points in each set of target points in a planned path.

8. The method according to claim 7, wherein, the step of dividing multiple target points into a set of target points respectively, for the target points corresponding to each target position in the to-be-executed list, according to a distance between the target points on the training trajectory and/or according to information of association between business operation corresponding to each target position in the to-be-executed list comprises:

determining distances between every two closest target points on the training trajectory respectively for the target points corresponding to each target position in the to-be-executed list, and when the distances between every two closest target points among a plurality of adjacent target points are all less than a second predetermined distance threshold, classifying the plurality of adjacent target points to be target points that satisfy a third predetermined condition;

disassembling business functions of the robot to obtain at least one business operation, dividing business operations with association relationship into the same business function group, establishing a second business function library including one or more business function groups in advance, matching the business operation respectively corresponding to each target position in the to-be-executed list with the second business function library, performing grouping on the business operation respectively corresponding to each target position in the to-be-executed list according to a result of the matching, and classifying target points that correspond to target positions corresponding to business operations that are determined to belong to the same business function group after the grouping to be target points that satisfy a fourth predetermined condition;

dividing the target points that satisfy the third predetermined condition and/or satisfy the fourth predetermined condition into a set of target points.

9. The method according to claim 1, wherein, after the step of generating a target region for tasks to be performed by the robot, the method further comprises:

determining an outer boundary of the target region and determining a restricted area corresponding to the tasks to be performed;

setting restriction fences on the outer boundary and in the restricted area.

10. The method of claim 1, wherein, the step of controlling the robot to traverse the target region until the robot completes the tasks to be performed comprises:

dividing the target region into multiple sub-regions;

controlling the robot to traverse each of the sub-regions to perform tasks until the robot completes the tasks to be performed in the target region.

11. The method according to claim 10, wherein, the step of controlling the robot to traverse each of the sub-regions to perform tasks until the robot completes the tasks to be performed in the target region comprises:

determining a sequence of sub-regions for the robot to perform tasks in each of the sub-regions;

controlling the robot to traverse the sub-regions one by one according to the determined sequence of sub-regions until the robot completes the tasks to be performed in all the sub-regions.

12. The method according to claim 10, wherein, the step of controlling the robot to traverse each of the sub-regions to perform tasks until the robot completes the tasks to be performed in the target region comprises:

S1: determining a nearest sub-region relative to the robot based on information of an initial position of the robot;

S2: controlling the robot to traverse the nearest sub-region to perform tasks;

S3: after completing the tasks in the nearest sub-region, determining the positioning information of an end point where the robot completes the tasks, and determining the next nearest sub-region relative to the end point;

S4: executing the steps S2 to S3 in a loop until the robot completes the tasks to be performed in all the sub-regions of the target region.

13. A robot, comprising a memory and a processor, wherein, the memory is configured to store computer-executable instructions;

the processor is configured to execute the computer-executable instructions stored in the memory to cause the robot to perform the method of claim 1.

14. A non-transitory computer-readable storage medium, wherein, the computer-readable storage medium has computer-executable instructions stored therein, and the computer-executable instructions, when executed by a processor, causes the processor to perform the method of claim 1.

15. The robot according to claim 13, wherein, the step of acquiring a training trajectory and an environment map in a training mode comprises:

when controlling the robot to start moving from an initial position, establishing a global coordinate system based on the initial position, and constructing a global map based on the global coordinate system;

during the movement of the robot, recording the training trajectory of the robot, and recording information of at least one target position on the training trajectory and information of business operation respectively corresponding to each target position;

binding relevant information in the global map, wherein the relevant information comprises: the training trajectory, the information of at least one target position, and the information of business operation respectively corresponding to each target position, which are bound to the global map.

16. The robot according to claim 13, wherein, after the step of generating a target region for tasks to be performed by the robot, the processor is further configured to execute the computer-executable instructions stored in the memory to cause the robot to determine an outer boundary of the target region and determine a restricted area corresponding to the tasks to be performed;

set restriction fences on the outer boundary and in the restricted area.

17. The robot according to claim 13, wherein, the step of controlling the robot to traverse the target region until the robot completes the tasks to be performed comprises:

dividing the target region into multiple sub-regions;

controlling the robot to traverse each of the sub-regions to perform tasks until the robot completes the tasks to be performed in the target region.

18. The non-transitory computer-readable storage medium according to claim 14, wherein, the step of acquiring a training trajectory and an environment map in a training mode comprises:

when controlling the robot to start moving from an initial position, establishing a global coordinate system based on the initial position, and constructing a global map based on the global coordinate system;

during the movement of the robot, recording the training
   trajectory of the robot, and recording information of at
   least one target position on the training trajectory and
   information of business operation respectively corre-
   sponding to each target position;

binding relevant information in the global map, wherein
   the relevant information comprises: the training trajec-
   tory, the information of at least one target position, and
   the information of business operation respectively cor-
   responding to each target position, which are bound to
   the global map.

* * * * *